March 1, 1955 D. T. ROBBINS ET AL 2,703,131
TIRE RETREAD MATERIAL APPLYING MACHINE
Filed Aug. 20, 1951 2 Sheets-Sheet 1
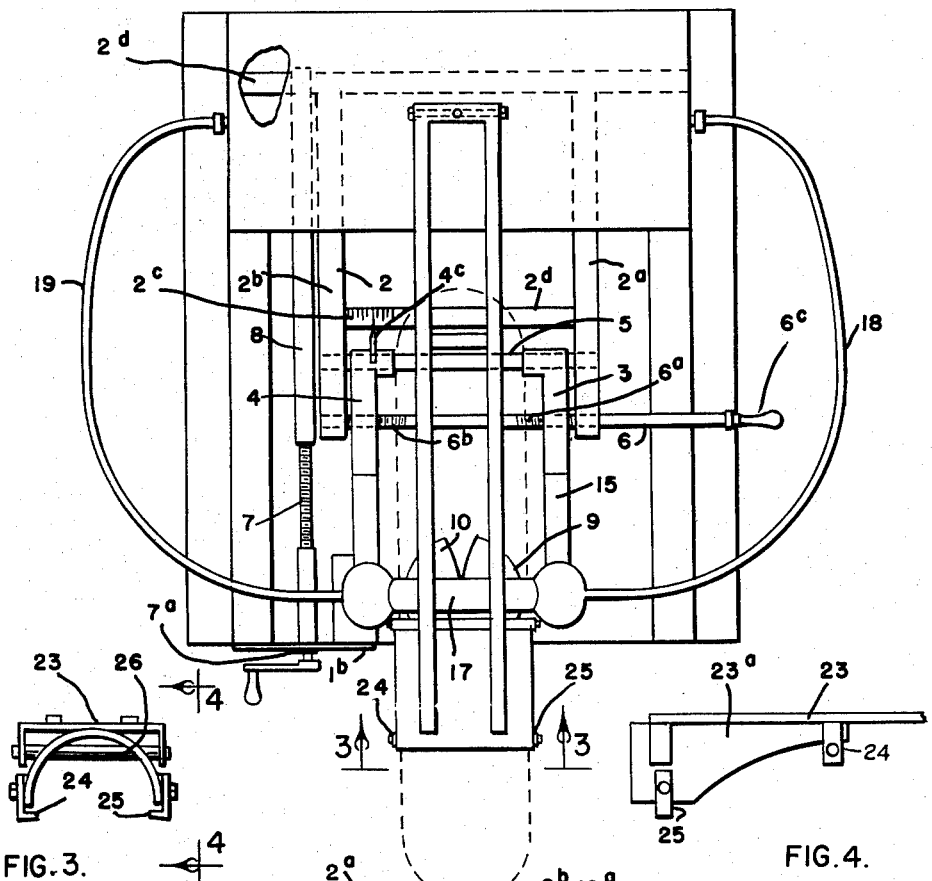
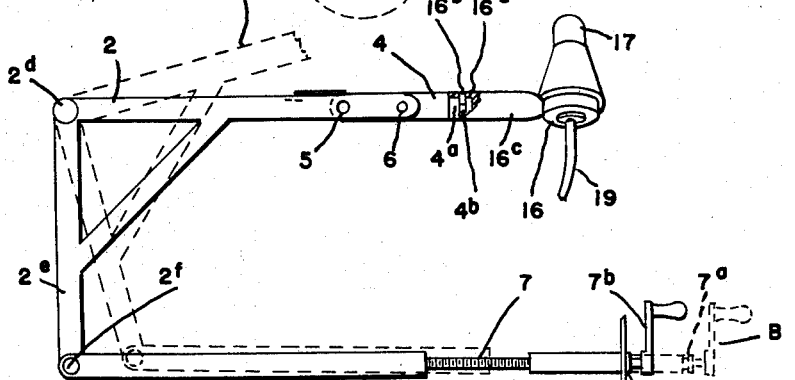
INVENTORS.
Daniel T. Robbins and
John F. McCrory
BY
Wm. H. Dean
AGENT

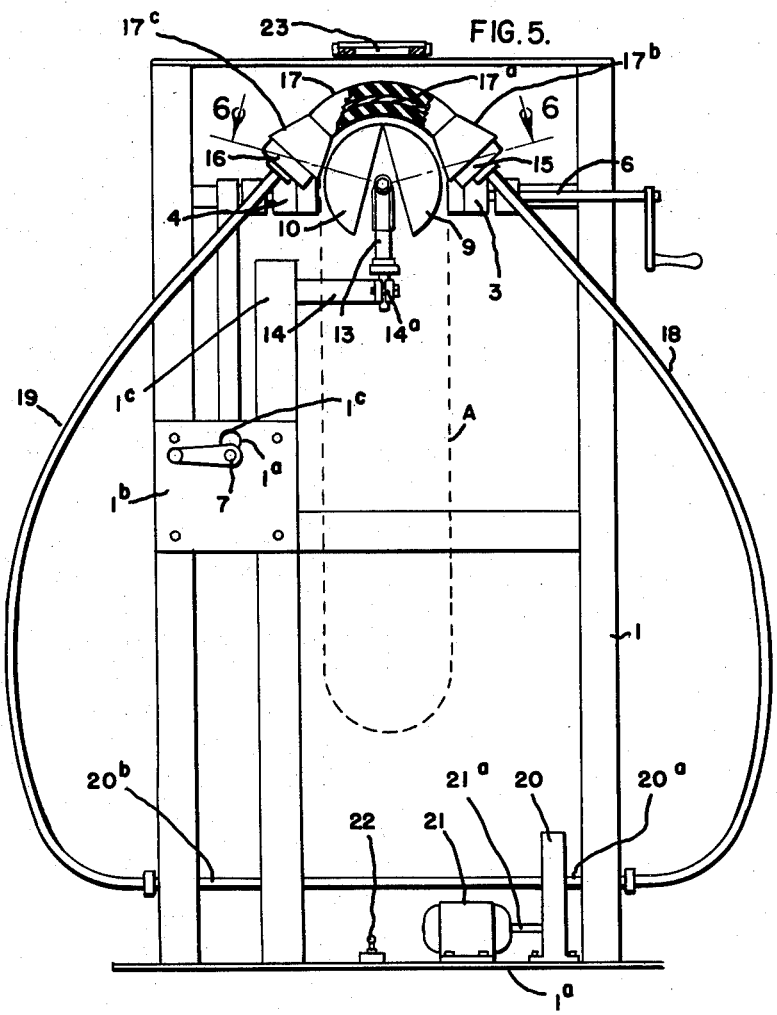
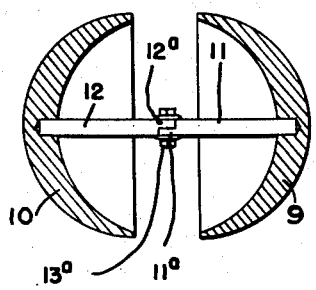
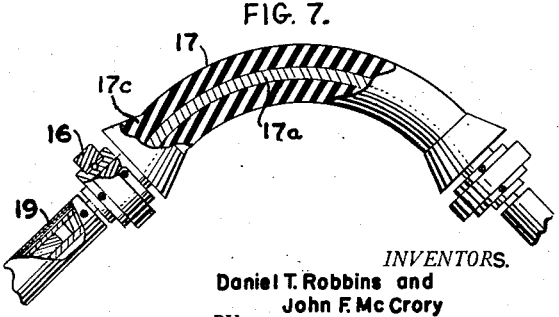
INVENTORS.
Daniel T. Robbins and
John F. McCrory

UNITED STATES PATENT OFFICE 2,703,131
Patented Mar. 1, 1955

2,703,131

TIRE RETREAD MATERIAL APPLYING MACHINE

Daniel T. Robbins, Heber, and John F. McCrory, Chula Vista, Calif., assignors of twenty-five per cent to said Robbins, ten per cent to said McCrory, thirty-two and one-half per cent to Harry E. Friedley, and thirty-two and one-half per cent to Russell Friedley Application August 20, 1951, Serial No. 242,694

26 Claims. (Cl. 154—9)

Our invention relates to a tire retread material applying machine and the objects of our invention are:

First, to provide a machine of this class which evenly and uniformly applies retread material to the repaired carcasses of vehicle tires preliminary to the curing of said material on the carcass for completion of retreading or recapping thereof, Second, to provide a machine of this class having a flexible roller particularly adapted to uniformly apply strips of retread material having feather-edge portions extending partially over the side walls of the tire, Third, to provide a tire retread material applying machine of this class which saves considerable time and greatly facilitates the application of retread material to vehicle tire carcasses, Fourth, to provide a machine of this class having novel means for accommodation of various size tires whereby the flexible material applying roller of the machine is automatically adjusted in both directions from the neutral axis of the tire in order to correspond with the diameter of a particular tire at its cross section, Fifth, to provide a machine of this class which is capable of uniformly applying considerable pressure to strips of tire retread material when applying the same to a prepared carcass whereby uniform distribution of material around the entire tire carcass is accomplished preliminary to the curing process to be performed thereon, Sixth, to provide a machine of this class which accurately aligns a strip of tire retread material with a prepared tire carcass during the application of the strip to the carcass so that the strip of material at its middle portion is directly aligned with the middle portion of the tire on which it is applied, Seventh, to provide a machine of this class which is very simple and easy to operate, Eighth, to provide a machine of this class having a flexible retread material applying roller journaled at opposite ends by freely pivoted bearings which provide for automatic adaptation of the flexible roller to the contour of tires having varying cross sectional dimenions, Ninth, to provide a machine of this class having novel tire supporting roller means which is readily and easily adjustable to conform with the inner wall dimensions of various size tires for supporting the same in opposed relation to the flexible retread material applying roller whereby the retread material may be applied under pressure and, Tenth, to provide a machine of this class which is very simple and economical of construction, efficient in operation and which will not readily deteriorate or get out of order.

With these and other objects in view as will appear hereinafter our invention consists of certain novel features of construction, combination and arrangement of parts and portions as will be hereinafter described in detail and particularly set forth in the appended claims, reference being had to the accompanying drawings and to the characters of reference thereon forming a part of this application in which:

Fig. 1 is a top or plan view of our tire retread applying machine.

Fig. 2 is a fragmentary side elevational view of the pivoted flexible roller supporting bracket means of said machine showing by dash lines the varying position thereof.

Fig. 3 is an end elevational view of the retread material guide taken from the line 3—3 of Fig. 1.

Fig. 4 is a fragmentary side elevational view of the retread material guide taken from the line 4—4 of Fig. 3.

Fig. 5 is a front elevational view of our tire retread material applying machine showing the retread material guide in section.

Fig. 6 is an enlarged sectional view of the tire supporting member taken from the lines 6—6 of Fig. 5, and Fig. 7 is a cross-sectional view of the flexible roller showing the connections between the roller and the flexible shafts.

Similar characters of reference refer to similar parts and portions throughout the several views of the drawings.

The frame 1, bracket 2, bearing supports 3 and 4, guide rod 5, screws 6 and 7, link 8, roller members 9 and 10, shafts 11 and 12, post 13, arm 14, bearings 15 and 16, flexible roller 17, flexible shafts 18 and 19, reducing gear 20, motor 21, switch 22, retread material guide 23, clips 24 and 25 and the roller 26 constitute the principal parts and portions of our tire retread material applying machine.

The frame 1, as shown best in Figs. 1 and 5 of the drawings is made of structural steel or any other suitable material and is provided with a base 1a on which the motor 21 is mounted. This motor 21 is provided with a shaft 21a connected to the gear box 20 for driving the same and this gear box 20 is provided with conventional flexible shaft extensions 20a and 20b projecting from opposite sides thereof to which the flexible shafts 18 and 19 are connected. These flexible shafts 18 and 19 are conventional shielded flexible shafts and are fixed to the bearings 15 and 16 respectively, which bearings 15 and 16 are supported on the bearing supports 3 and 4 respectively. Connected to the flexible shafts 18 and 16 and extending through the bearings 15 and 16 respectively is the flexible steel cable core 17a of the flexible roller 17. This flexible roller 17 is cast on the core 17a and is preferably made of rubber or other suitable synthetic material all as shown best in Fig. 5 of the drawings. It will be noted that the flexible roller 17 is provided with tapered end portions 17b and 17c which are annular and diverge toward the ends of the flexible roller 17 all as shown best in Fig. 5 and Fig. 7 of the drawings. The bearings 15 and 16 are pivoted about the axis of the bearing supports 3 and 4 in order to provide for angular adjustment of said bearings 15 and 16 in order to accommodate the cross sectional shape of different size tires. The bearing 16 as shown in Fig. 2 of the drawings is provided with a hollow sleeve 16a fitted over a reduced diameter stub 4a of the arm 4 on which said bearing 16 is rotatably mounted. It will be noted that the screw 16b fixed in the shank 16c of the bearing 16 engages an annular groove 4b in the arm 4 preventing longitudinal displacement of the shank 16c relative to the arm 4. The arms 3 and 4 are laterally slidable on the guide rod 5 which is fixed to the bracket 2 intermediate the arm portions 2a and 2b thereof as shown best in Fig. 1 of the drawings. The arms 3 and 4 are provided with internally screw threaded portions engaging the right and left hand screw threads 6a and 6b respectively of the screw 6 which is longitudinally stationarily mounted in the arm portions 2a and 2b of the bracket 2. This screw 6 is provided with a crank handle 6c for use in manual operation thereof. The arm 4 is provided with a pointer 4c adapted to traverse a scale 2c on the cross member 2d of the bracket 2 whereby the spaced relation of the bearings 15 and 16 are indicated which may correspond to different cross sectional dimensions of various tires. A bracket 2 is pivoted on the frame 1 by means of the axle 2d and this bracket 2 is provided with a downwardly extending arm 2e pivotally connected to the link 8 by means of the pin 2f. This link 8 is provided with an internally screw threaded bore screw threadably engaged with the screw 7 which incorporates an annnular groove portion 7a near the crank handle 7b thereof engageable with the slot 1a in a plate 1b shown best in Figs. 1, 2 and 5 of the drawings. The arm 14 is fixed to the frame 1 and extends horizontally from the upright portion 1c of the frame 1 as shown in Fig. 5 of the drawings and this arm 14 is provided with a clamp portion 14a adapted to fix the post 13 in certain vertical elevated positions for supporting the roller members 9 and 10 in corresponding position to the tire shown by dash lines A in Fig. 5 of the drawings. Thus the roller members 9 and 10 are rigidly supported in fixed relationship on the frame 1 so that the tire A may be supported thereby under compression of the flexible roller 17. The post 13 is provided with a lateral bolt 13a extending therethrough which also extends through the ends 11a and 12a of the shafts 11 and 12 on which the hemispherical roller members are rotatably mounted. These shafts 11 and 12 are thus angularly adjustable in order to provide for proper support of a tire as illustrated by dash lines A and to accommodate various cross sectional dimensions of various tires. The bolt 13a fixes the shafts 11 and 12 in certain position relative to the post 13. The retread material guide 23 is fixed to the upper side of the frame 1 and extends over the roller members 9 and 10 above the flexible roller 17 for the purpose of guiding strips of retread material onto the prepared tire carcass as shown by dash lines A in Fig. 5 of the drawings. The retread material guide 23 is provided with an arcuate plate portion 23a having the clips 24 and 25 fixed to the opposite lower edges thereof for the purpose of engaging opposite edges of the retread material strip. The roller 26 mounted on the retread material guide 23 is arranged to deflect or alter the retread material strip into the proper cross sectional shape to match the crown of the tire being retreaded. It will be noted that the retread material guide 23 helps to align the retread material strip when it is being applied to the prepared tire carcass A by the flexible roller 17 in opposed relationship to the roller members 9 and 10 on which the tire carcass A is supported.

The operation of our tire retread material applying machine is substantially as follows:

In order to place the tire carcass A on the roller members 9 and 10 the annular groove 7a of the screw 7 is released from the notch 1a in the plate 1b of the frame 1 by upward movement so that the shank of the screw 7 passes through the enlarged notch portion 1c. When the shank portion of the screw 7 is slidably moved through the opening 1c it projects to a position as shown by dash line B in Fig. 2 of the drawings causing a corresponding angular elevated position of the arms 2a and 2b of the bracket 2 carrying the bearings 15 and 16 together with the flexible roller 17 upwardly providing clearance between the flexible roller 17 and the roller members 9 and 10 for the placement of the tire carcass A on the rollers 9 and 10. The screw 7 by means of a manual handle 7b may then be extended into the link 8 and the annular groove 7a may be reengaged with the slot 1a. A strip of retread material may be placed on the surface of the tire carcass A, beneath the flexible roller 17 and the screw 7 may be rotated in order to return the bracket 2 to the solid line position as shown in Fig. 2 of the drawings whereupon the flexible roller 17 exerts pressure on the retread material strip over the tire carcass. A which is supported on the roller members 9 and 10. It will be noted that the screw 6 is initially operated to adjust the spacing of the bearing members 15 and 16 for causing a corresponding adjustment in the flexible roller 17. During application of the tire retread material strip the motor 21 is operated which causes operation of the flexible shafts 18 and 19 which synchronously drive opposite ends of the flexible roller 17. This flexible roller 17 bears downwardly on the retread material strip pressing the same and rolling the same onto the tire carcass A in opposed relationship to the stationary supporting roller members 9 and 10 which rotate inside the tire carcass A. It will be noted that the diverging end portions 17b and 17c of the flexible roller 17 intimately engage the feather edge portions at opposite edges of the tire retread material strip and force the same downwardly adjacent the side walls of the tire carcass A for intimately rolling the same into position so that the entire retread material strip will be in proper smooth intimate contact with the carcass preliminary to placing the same in a curing mold. The retread material guide 23 provides preliminary alignment of the retread material strip as it enters its position beneath the flexible roller 17 on the outer crown surface of the carcass A and it will be noted that the spherical form of the roller members 9 and 10 in their particular adjusted position to fit a tire of certain diameter uniformly supports the pressurized portion of the retread material strip and the tire carcass.

Though we have shown and described a particular construction combination and arrangement of parts and portions we do not wish to be limited to this particular construction, combination and arrangement but desire to include in the scope of our invention the construction, combination and arrangement substantially as set forth in the appended claims.

Having thus described our invention what we claim as new and desire to secure by Letters Patent is:

1. In a tire retread material applying machine a frame, rollers for supporting the internal portion of a tire carcass and a flexible driven roller extending transversely across the tire and being engageable with a strip of material on the outer side of a tire carcass for rolling said strip of material thereon.

2. In a tire retread material applying machine a frame, rollers for supporting the internal portion of a tire carcass, a flexible driven roller extending transversely across the tire and being engageable with a strip of material on the outer side of a tire carcass for rolling said strip of material thereon, said flexible roller having bearings rigidly supported at opposite sides of said first mentioned rollers, and flexible shafts connected with opposite ends of said flexible roller.

3. In a tire retread material applying machine a frame, rollers for supporting the internal portion of a tire carcass, a flexible driven roller extending transversely across the tire and being engageable with a strip of material on the outer side of a tire carcass for rolling said strip of material thereon, said flexible roller having bearings rigidly supported at opposite sides of said first mentioned rollers, flexible shafts connected with opposite ends of said flexible roller and said bearings being adjustable in spaced relationship with each other at opposite sides of said first mentioned rollers.

4. In a tire retread material applying machine a frame, rollers for supporting the internal portion of a tire carcass, a flexible driven roller extending transversely across the tire and being engageable with a strip of material on the outer side of a tire carcass for rolling said strip of material thereon, said flexible roller having bearings rigidly supported at opposite sides of said first mentioned rollers, flexible shafts connected with opposite ends of said flexible roller, said bearings being adjustable in spaced relationship with each other at opposite sides of said first mentioned rollers, and said flexible roller having diverging opposite end portions.

5. In a tire retread material applying machine a frame, rollers for supporting the internal portion of a tire carcass, a flexible driven roller engageable with a strip of material on the outer side of a tire carcass for rolling said strip of material thereon, said flexible roller having bearings rigidly supported at opposite sides of said first mentioned rollers, flexible shafts connected with opposite ends of said flexible roller, said bearings being adjustable in spaced relationship with each other at opposite sides of said first mentioned rollers, said flexible roller having diverging opposite end portions comprising a flexible cable core embedded in a resilient enlarged sheath.

6. In a tire retread material applying machine a frame, rollers for supporting the internal portion of a tire carcass, a flexible driven roller engageable with a strip of material on the outer side of a tire carcass for rolling said strip of material thereon, said flexible roller raving bearings rigidly supported at opposite sides of said first mentioned rollers, flexible shafts connected with opposite ends of said flexible roller, said bearings being adjustable in spaced relationship with each other at opposite sides of said first mentioned rollers, said flexible roller having diverging opposite end portions comprising a flexible cable core embedded in a resilient enlarged sheath, said pivoted brackets supporting said bearings whereby said flexible roller is readily movable away from said first mentioned rollers.

7. In a tire retread material applying machine a frame, rollers for supporting the internal portion of a tire carcass, a flexible driven roller engageable with a strip of material on the outer side of a tire carcass for rolling said strip of material thereon, said flexible roller having bearings rigidly supported at opposite sides of said first mentioned rollers, flexible shafts connected with opposite ends of said flexible roller, said bearings being adjustable in spaced relationship with each other at opposite sides of said first mentioned rollers, said flexible roller having diverging opposite end portions comprising a flexible cable core embedded in a resilient enlarged sheath, pivoted brackets supporting said bearings whereby said flexible roller is readily movable away from said first mentioned rollers, and adjusting means for said bracket for forcing said flexible roller toward said first mentioned roller.

8. In a tire retread material applying machine a frame, rollers for supporting the internal portion of a tire carcass, a flexible driven roller engageable with a strip of material on the outer side of a tire carcass for rolling said strip of material thereon, said flexible roller having bearings rigidly supported at opposite sides of said first mentioned rollers, flexible shafts connected with opposite ends of said flexible roller, said bearings being adjustable in spaced relationship with each other at opposite sides of said first mentioned rollers, said flexible roller having diverging opposite end portions comprising a flexible cable core embedded in a resilient enlarged sheath, pivoted brackets supporting said bearings whereby said flexible roller is readily movable away from said first mentioned rollers, a screw-threaded rod engaging said bracket for forcing said flexible roller toward said first mentioned rollers and means for driving said flexible shafts.

9. In a tire retread material applying machine a frame, rollers for supporting the internal portion of a tire carcass, a flexible driven roller engageable with a strip of material on the outer side of a tire carcass for rolling said strip of material thereon, the first mentioned rollers consisting of a pair of hemispherical roller members having their axes disposed in obtuse angular relationship to each other, a vertical post on which said hemispherical roller members are mounted, and said vertical post being adjustably mounted on said frame.

10. In a tire retread material applying machine a frame, rollers for supporting the internal portion of a tire carcass, a flexible driven roller engageable with a strip of material on the outer side of a tire carcass for rolling said strip of material thereon, the first mentioned rollers consisting of a pair of hemispherical roller members having their axes disposed in obtuse angular relationship to each other, a vertical post on which said hemispherical roller members are mounted, said vertical post adjustably mounted on said frame and a guide in spaced relationship with said first mentioned rollers for guiding material to a position intermediate said flexible roller and said first mentioned rollers.

11. In a retread material applying machine a frame, rollers being stationarily mounted thereon for engaging the inside surface of a tire carcass for supporting the same, a flexible roller for engaging the outer surface of a tire carcass in opposed relationship to said first mentioned rollers, and means for directing a tire retread strip onto the outer side of a tire carcass.

12. In a retread material applying machine a frame, rollers being stationarily mounted thereon for engaging the inside surface of a tire carcass for supporting the same, a flexible roller for engaging the outer surface of a tire carcass in opposed relationship to said first mentioned rollers, means for directing a tire retread strip onto the outer side of a tire carcass, means for rotating said tire, said first mentioned roller and said flexible roller.

13. In a retread material applying machine a frame, rollers being stationarily mounted thereon for engaging the inside surface of a tire carcass for supporting the same, a flexible roller for engaging the outer surface of a tire carcass in opposed relationship to said first mentioned rollers, means for directing a tire retread strip onto the outer surface of a tire carcass, means for rotating said tire, said first mentioned rollers and said flexible roller comprising flexible shaft bearings stationarily mounted on said frame connected with flexible shafts at opposite ends of said flexible roller for synchronously operating opposite ends of said flexible roller in opposed relationship to said rollers.

14. In a tire retread material applying machine, means for supporting a tire carcass during rotation thereof, and an elongated flexible roller having its longitudinal axis defining a standing curve form during rotation of the roller for substantial conformity with the transverse exterior curvature of a tire carcass to be processed on the machine.

15. Apparatus according to claim 14 and wherein said flexible roller is driven and comprises means for rotating a tire in the machine.

16. Apparatus according to claim 15 and including means for driving said roller simultaneously from both ends.

17. Apparatus according to claim 14 and wherein said flexible roller comprises a flexible cable core, and a covering of resilient material on said core.

18. In a tire retread material applying machine, means for supporting a tire carcass during rotation thereof, comprising a pair of idler rollers of hollow hemispherical shape, and means for mounting said rollers on axes of rotation inclined slightly with reference to each other.

19. In a tire retread material applying machine, means for supporting a tire carcass during rotation thereof, comprising a pair of idler rollers of hollow hemispherical shape, and means for mounting said rollers on axes of rotation inclined slightly with reference to each other, an elongated flexible roller having its longitudinal axis defining a standing curve form during rotation of the roller for substantial conformity with the transverse exterior curvature of a tire carcass to be processed on the machine, said axes defining an obtuse included angle on a plane including the axis of said flexible roller.

20. A tire tread rebuilding machine comprising a first roller means adapted to substantially fit the interior curvature of a tire carcass, a second flexible roller means adapted to substantially fit the exterior curvature of a tire carcass, and means for moving the tire carcass between said first and second roller means.

21. A tire tread rebuilding machine for applying a camelback comprising a first roller means shaped to substantially fit the interior transverse curvature of a tire casing, a second flexible arcuate roller means to substantially fit the exterior curvature of a tire casing in opposing relation to the first roller means, and means for rotating one of said roller means.

22. A tire tread rebuilding machine comprising a freely rotating idler roller means shaped to substantially fit the interior transverse curvature of a tire casing, a driven flexible roller in opposing relation to said idler roller means, and means for adjusting said flexible roller to fit the exterior of the tire casing.

23. A tire tread rebuilding machine comprising a freely rotating idler roller means shaped to substantially fit the interior transverse curvature of a tire casing, a driven flexible roller, means for moving said flexible roller toward said idler roller means so that the flexible roller is in driving contact with a tire casing in opposing relation to said idler roller means, and means for adjusting said flexible roller to fit the exterior curvature of the tire casing.

24. A tire tread rebuilding machine comprising a freely rotating idler roller means shaped to substantially fit the interior transverse curvature of a tire casing, a driven flexible roller, means for moving said flexible roller toward said idler roller means so that the flexible roller is in driving contact with a tire casing in opposing relation to said idler roller means, emergency release means releasing said flexible roller to move away from said idler roller means, and means for adjusting said flexible roller to fit the exterior curvature of the tire casing.

25. A tire tread rebuilding machine comprising a frame, freely rotating tire supporting idler rollers mounted on said frame, a driven flexible roller mounted on said frame for pivotal movement as a whole, means for holding said flexible roller in driving contact with a tire casing on said idler rollers, emergency release means for allowing said flexible roller to move away from said idler roller means, and means for adjusting said flexible roller to fit the exterior curvature of the tire casing.

26. A tire tread rebuilding machine comprising a frame, freely rotating tire supporting idler rollers mounted on said frame, a driven flexible roller pivotally mounted on said frame, means for holding said flexible roller in driving contact with a tire casing on said idler rollers, means for shifting said flexible roller away from said idler roller means, means for adjusting said flexible roller to fit the exterior curvature of the tire casing, and freely rotating guide rollers below said idler rollers, said guide rollers being biased to engage the sides of a tire casing therebetween.

References Cited in the file of this patent

UNITED STATES PATENTS

| | | |
|---|---|---|
| 1,981,828 | Shook | Nov. 20, 1934 |
| 2,083,886 | White | June 15, 1937 |
| 2,381,379 | Stevens | Aug. 7, 1945 |
| 2,498,953 | Glynn | Feb. 28, 1950 |
| 2,556,264 | Flynn | June 12, 1951 |
| 2,565,071 | Frazier | Aug. 21, 1951 |
| 2,600,291 | Engler | June 10, 1952 |
| 2,690,207 | Godfrey | Sept. 28, 1954 |